INVENTOR
Adolph A. Thomas

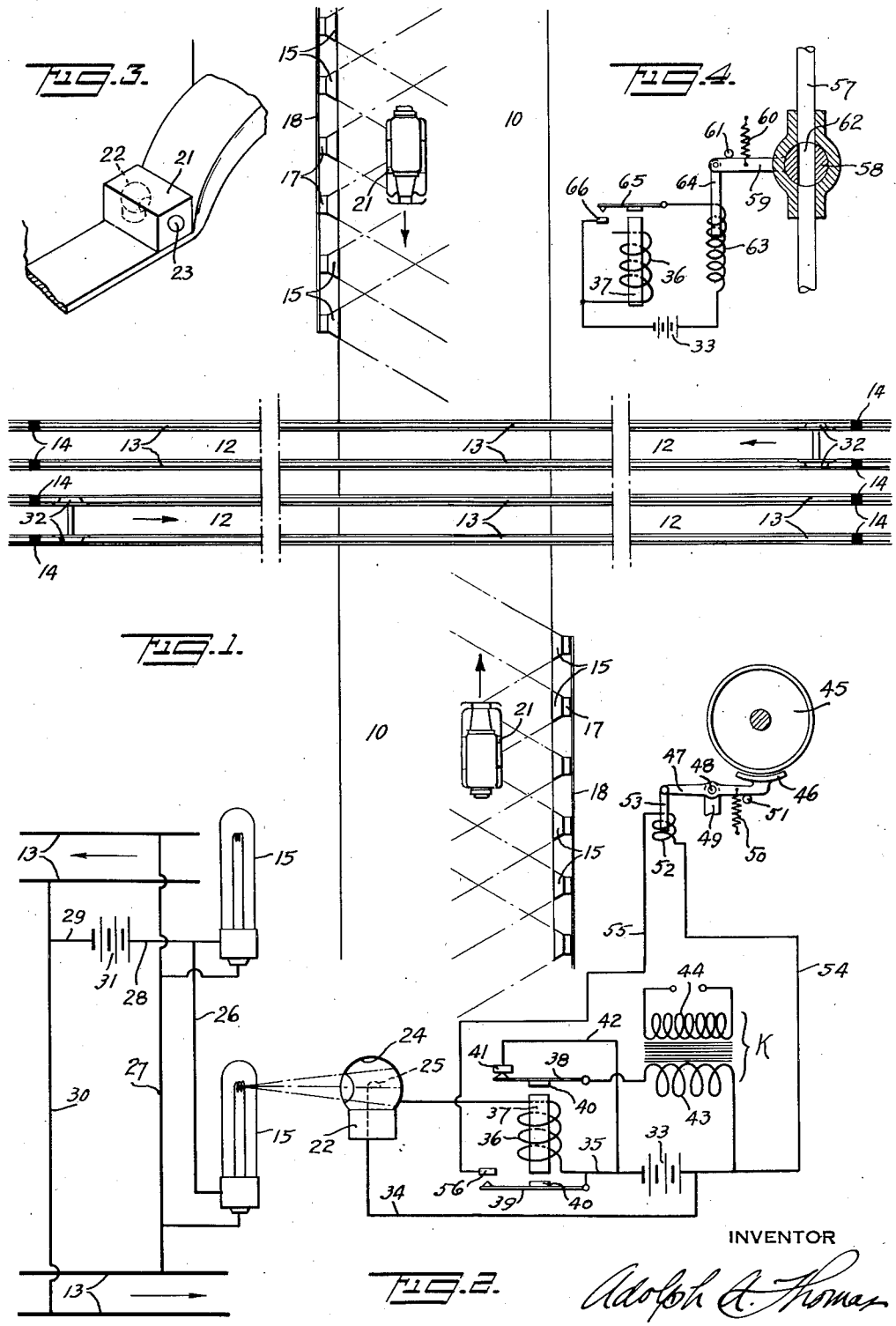

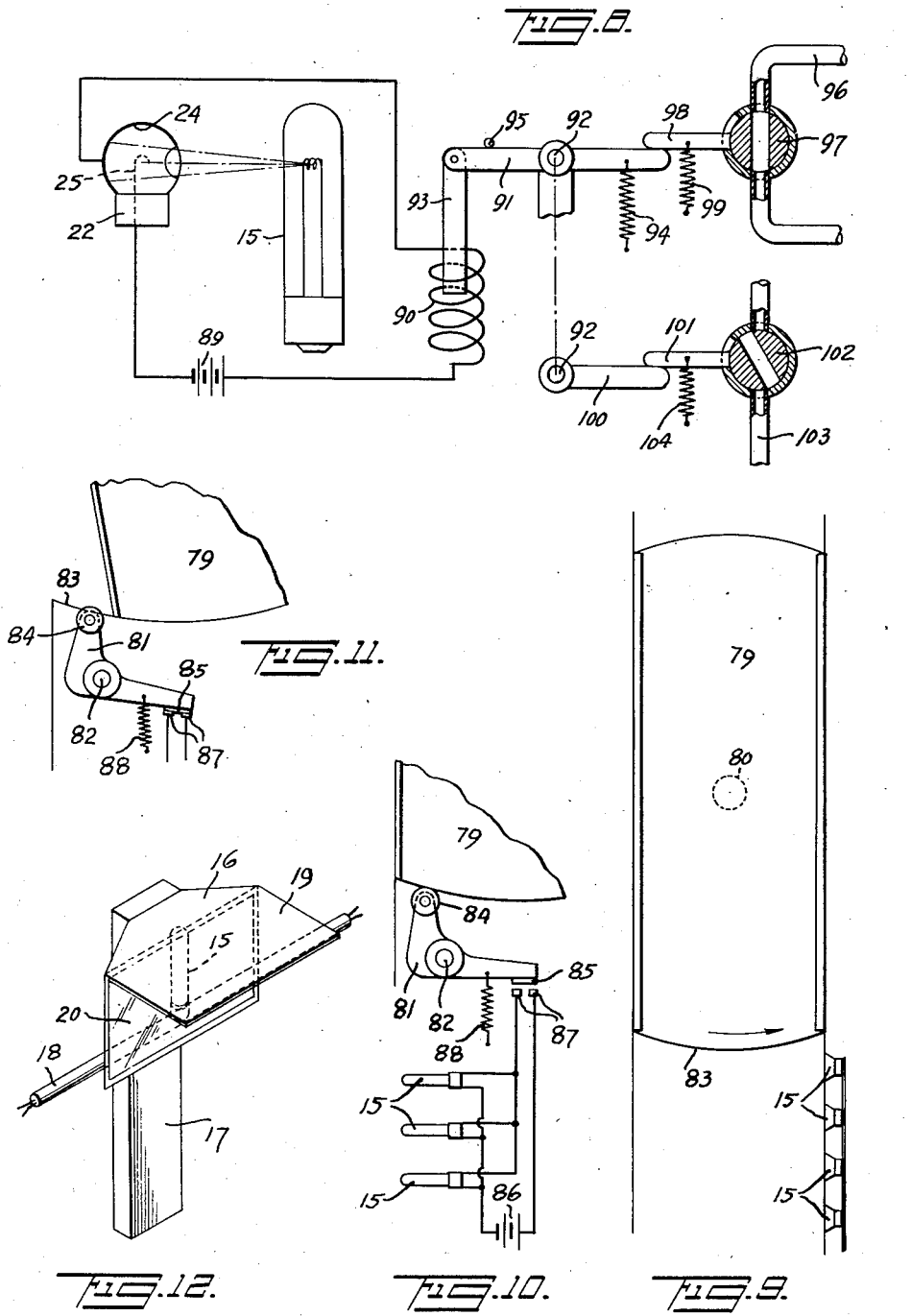

Patented Oct. 18, 1932

1,883,107

UNITED STATES PATENT OFFICE

ADOLPH A. THOMAS, OF NEW YORK, N. Y.

AUTOMATIC SAFETY SYSTEM FOR SELF-PROPELLED VEHICLES

Application filed July 2, 1930. Serial No. 465,252.

This invention has for its principal object the prevention of automobile accidents at dangerous points on highways, particularly at railroad crossings and bridges, where many fatalities have occurred. An automobile equipped with my new safety device is automatically stopped when it comes to a bridge that is uncrossable or to a railroad crossing over which a train is passing or closely approaching. As applied to railroad trains, my invention operates to stop a train when the track ahead is demolished, as by the destruction of a bridge, or when the roadbed is temporarily interrupted, as by an open bridge across a river.

I shall first explain how my invention prevents automobile accidents at railroad crossings. Such fatalities, which in the past have been all too numerous, may be ascribed to two general causes: The driver either does not see or hear an approaching train and so imagines the track to be clear; or, seeing a train, he falsely calculates that he can get ahead of it. There is only one sure way to eliminate such accidents: by automatically taking the control of the car away from the driver when it would be dangerous to cross the tracks. That is what my invention accomplishes by means of an automatic stop system which is absolutely reliable in its operation and is so simple that it can be installed at a trifling cost. A bank of electric lamps is placed along a highway on either side of a railroad crossing for a safe distance (say, two hundred feet or so). The stretch of highway guarded by these lamps may be called a danger zone. The rails that cross the highway are insulated and electrically connected to both banks of lights. This insulated rail section extends a sufficient distance from the highway in either direction. The lamp circuit is normally open, but when a train is on the insulated section, the circuit is closed and the lamps throw a flood of strong light across the highway.

An automobile controlled by my safety system carries on the outside a small box containing a photo-electric cell arranged to be activated by the light of the train-controlled lamps. This light cell, which is not operatively affected by daylight, is electrically connected to the ignition system of the car, or to an electromagnetic member which controls the fuel supply to the engine. The circuit of the photo-electric cell is normally open and does not interfere with the usual operations of the automobile. However, when the car approaches a railroad crossing and a train is on the insulated track section, the light of the lamps strikes the photo-electric cell and closes an electric circuit which automatically stops the engine of the car. This is done either by killing the ignition or cutting off the gas supply, and it is also possible to put on the brakes at the same time, so that the car is brought to a quick stop. As long as light from the highway lamps continues to shine on the photo-electric cell of the car (that is, as long as there is danger of collision with a crossing or approaching train), the driver can not move the car and he must wait until the danger is past. When that happens, the lights in the danger zone go out and the automobile is automatically restored to operative condition.

Our vast network of railroad systems and motor highways includes thousands of bridges, many of which are located in regions where washouts occur during floods and storms. Other bridges span navigable rivers and must be opened for the passage of ships. In darkness, storms and fog, engineers and motorists sometimes can not see the demolished or open condition of a bridge toward which they are speeding, and the only way to prevent accidents in such circumstances is to make the very existence of the danger stop the trains and automobiles. I accomplish this by my automatic stop system in a manner similar to that employed for preventing accidents at railroad crossings. Electric lamps are placed along the highway at either end of a bridge. As long as the bridge is in normal safe condition, the lamps are unlighted and do not affect the photo-electric cells on the automobiles or trains approaching the bridge. However, when the bridge is down or swung open, or is otherwise unsafe to cross, the lamps automatically light and stop a train or automobile before it reaches the bridge, as previously explained.

The novel features and operation of my safety system will be understood from a description of the accompanying drawings, in which—

Fig. 1 is a diagrammatic plan of a railroad crossing at a highway where my safety system is installed;

Fig. 2 is a diagram of electric circuits illustrating the automatic operation of the system;

Fig. 3 shows one way of placing a photo cell box on an automobile;

Fig. 4 is a detached view showing a fuel valve controlled by a solenoid;

Fig. 8 shows diagrammatically a safety system in which a photo cell simultaneously closes a fuel valve and opens an airbrake valve on an engine or automobile when the road ahead is impassable.

Fig. 9 is a simplified plan of a drawbridge equipped with my invention;

Fig. 10 shows an electric switch controlled by the bridge of Fig. 9;

Fig. 11 shows how the switch of Fig. 10 is closed when the bridge is open; and

Fig. 12 is a detached perspective of a suitable reflector for the controlling lamps on the highway.

Figure 5:
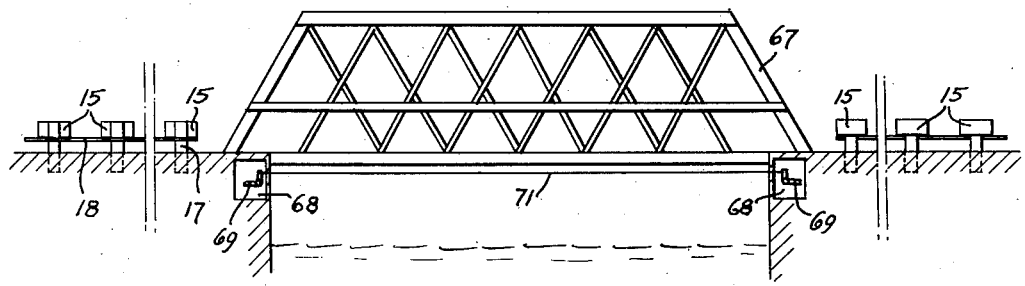
Fig. 5 illustrates the application of my safety system to a highway bridge.

I shall first describe the safety system illustrated in Figs. 1–4. A highway 10 is crossed by one or more railroad tracks which are electrically insulated for a certain distance on either side of the road. These insulated sections are marked 13 and extend between the insulation 14. If the rails 12 are one-way tracks, the insulated sections 13 need not extend very far to the right of the highway, but to the left of it (where all trains approach) they should run for a safe distance. This point is easily determined by experiment, but I think that the distance should be at least one thousand feet. Where trains are apt to cross at fast speed (say, 50 or 60 miles an hour) the insulated sections 13 ought to begin at about one mile or more from the highway. When a single track across a highway is used by trains in both directions, the insulated sections 13 must extend the same long distance on either side of the road.

On both sides of the railroad crossing, the highway 10 is guarded by electric lights 15 arranged along the right side of the road for a suitable distance, which I should judge to be about 300 or 400 feet. These lights are so spaced as to throw a flood of illumination across the highway, and this lighted area constitutes a danger zone. The lights 15 are preferably electric lamps enclosed in reflectors 16 (see Fig. 12) which spread the light rays laterally to provide a substantially uniform field of light. The reflectors 16 are conveniently mounted on posts 17, and a pipe 18 contains the necessary wiring. The height and shape of reflectors 16 are such that the light of lamps 15 takes in any automobile from top to ground when it enters the danger zone. A projecting shield 19 may be used to keep rain and snow off the glass plate 20 of each reflector, and at the same time this shield may act to deflect light rays in the proper direction toward the roadway.

Automobiles adapted to be controlled by my safety system carry on the outside a small box 21 containing a photo-electric cell 22 of suitable construction. For convenience I shall use the abbreviated term "photo cell", which is being adopted by electrical engineers. The front of box 21 is provided with an opening 23 for admitting light rays to the cell. The interior of box 21 is light-proof and the opening 23 is preferably covered with a transparent window or lens, so that the box is entirely closed. In the drawings I have shown the box 21 mounted on the righthand running board of the car in such position that the light from lamps 15 strikes the photo-sensitive cathode 24 of the cell through the window or lens 23. The latter may be so constructed as to concentrate the light rays on the cathode. There is no need to show or describe any structural details of photo cell 22, because these devices are well known and obtainable in the open market or from manufacturers on order. I have therefore indicated cell 22 in diagrammatic outline only, showing a spherical bulb coated inside with light-sensitive material adapted to emit electrons under the action of light to a positive electrode or anode 25. The electron-emitting material of cathode 24 is such that it is not operatively affected by daylight or the white light of an electric lamp. There are photo cells adapted to give maximum response to light waves of certain colors only, such as red, green, ultraviolet, and perhaps others. For example, if the cathode 24 comprises a thin film of caesium on cuprous oxide, it is operatively affected by red light only, and the lamps 15 send out light waves giving that particular color.

The electric lamps 15 are connected in parallel to conductors 26 and 27, which are housed in pipe 18. For lack of space I have indicated only two lamps in the circuit diagram of Fig. 2, but it will be understood that the other lamps are connected in the same way. Conductor 26 is connected to battery lead 28, and conductor 27 is connected to one rail of each pair of insulated tracks 13. The other battery lead 29 is connected by a conductor 30 to the other rails of the insulated track sections. For convenience I have indicated a battery as the source of current for lamps 15, but the latter may be connected to the lighting system of highway 10, or an electric generator on the passing train may furnish the necessary current. It will therefore be understood that the battery 31 represents any suitable current supply for the car-controlling lamps 15. The wiring to the tracks is concealed in any practical way, as in an underground pipe. It is clear from Fig. 2 that the battery circuit is normally open and lamps 15 are unlighted. However, when a train enters upon either of the insulated track sections 13, the circuit is closed through the metal wheels 32 of the train and the lamps 15 throw a flood of light across the highway on both sides of the crossing. When an automobile enters the lighted danger zone, the photo cell 22 is activated and automatically stops the car. I shall now describe how that is done.

The automobile battery 33 is connected at the positive side by a wire 34 to the anode 25 of photo cell 22, and the negative side of the battery is connected by a wire 35 to one end of a coil 36 which surrounds a magnetic core 37. At the opposite ends of core 37 are two movable switch arms 38 and 39, which may be in the form of spring blades supported at one end and each carrying a magnetic armature piece 40. The switch arm 38 is normally held by its inherent tension against a fixed contact 41, which is connected by a wire 42 to one side of battery 33. The ignition coil of the car is indicated as a whole by K, and the low-tension primary winding 43 is connected at one end to the switch arm 38, while the other end of the winding is connected to one terminal of battery 33. The high-tension secondary winding 44 is connected to the spark plugs of the engine in the usual way, as will be understood without further explanation.

Still referring to Fig. 2, there is a wheel or drum 45 which represents diagrammatically the brake mechanism of an automobile. At the present time, practically all cars have four-wheel brakes which are almost without exception of the internal expansion type. Since the construction and operation of these brakes are well understood, and since furthermore they constitute no part of this invention, I have considered it sufficient to indicate the brake mechanism of an automobile by the rotary wheel or drum 45, which is stopped by a brake-shoe 46. The member 45 may also be considered as representing the flywheel of the automobile engine. The brake-shoe 46 is carried by a lever 47 pivoted at 48 on a suitable support 49. A contracting coil spring 50 normally holds the lever 47 against a fixed stop 51, so that the brake-shoe 46 is out of contact with the rotary member 45. The brake lever 47 is actuated by a solenoid comprising a coil 52 and a reciprocable core 53, which is connected to one end of the lever. One side of the solenoid coil 52 is connected by a wire 54 to the battery 33, and the other side of the coil is connected by a wire 55 to a fixed contact 56. The inherent set or tension of the movable switch arm 39 holds it normally away from contact 56, so that the circuit of coil 52 is normally open.

As long as the photo cell 22 is inactive, the circuit of coil 36 is open, because there is no electronic conducting path between the elements 24 and 25 of the cell. Consequently, the switch arm 38 is closed and the ignition coil K is in operative condition to ignite the explosion charges in the engine cylinders. At the same time, the switch arm 39 is open so that the brake-shoe 46 is inoperative. When an automobile travelling along the highway 10 approaches the railroad crossing from either side, the car is free to cross the tracks if it is safe to do so—that is, if there is no train on the insulated sections 13. But when an automobile approaches the crossing at a time when a train is on the insulated sections 13, the electric lamps 15 throw a flood of light across the highway along each side of the crossing and the photo cell 22 of every car entering the illuminated zone is instantly activated to energize coil 36. The energizing of coil 36 opens the switch arm 38 to break the circuit of the primary ignition winding 43, so that the ignition system instantly fails and disables the power plant of the car and the latter is compelled to stop, even against the driver's will. The second result achieved by energizing coil 36 is the closing of switch arm 39 to complete the circuit through solenoid coil 52 which moves the shoe 46 into pressure contact with brake member 45 to bring the car to a quick stop.

It will thus be seen that when an automobile enters the lighted danger zone on either side of a railway crossing, the control of the car is automatically taken away from the driver, who is therefore unable to cross the tracks when it would be fatal or even risky to do so. As soon as a crossing train moves off the insulated sections 13, the lights 15 go out and all cars that were stopped in the lighted danger zones are automatically restored to operative condition. When the controlling lamps 15 are extinguished, the cells 22 of the stopped cars become dark and the connected disabling coil 36 is de-energized, so that the switch arm 38 is closed and the other switch arm 39 is open. It should be understood that the disabling coil 36 is energized to actuate the switch arms 38 and 39 only when the cathode 24 of cell 22 is subjected to the particular light of lamps 15. The various parts are so designed that coil 36 requires a certain strength of current to operate the switch members 38 and 29, and this strength of current is obtainable only when cathode 24 is activated by the light of lamps 15, which cause an electronic emission of requisite degree in the cell. Instead of connecting the photo cell directly in the circuit of coil 36, I may connect it in a relay circuit adapted to operate only when the cell is activated by lamps 15, to close the circuit of battery 33 through the coil. If necessary, the current caused to flow by the activation of cell 22 may be amplified to the required degree, as by means of the usual electron tubes. As previously stated, the light emitted by lamps 15 may be red, and the photo cell 22 would then be a caesium cell affected only by red light. Furthermore, the mere flooding of the highway with red light when a train is crossing or approaching may have a deterrent effect on some drivers, who would sense the danger ahead and be inclined to stop the car or at least slow it down.

Instead of disabling the ignition system of a car when it enters a lighted danger zone, I may cut off the fuel supply to the engine cylinders, and this modification is shown in Fig. 4. A feed pipe 57, which may be connected to the vacuum tank of the car, is controlled by a rotary valve 58 to which an arm or lever 59 is attached. A contracting coil spring 60 normally holds the arm 59 against a fixed arm 61, so that the valve passage 62 is in line with feed pipe 57. The valve arm 59 is actuated to closed position by a solenoid comprising a coil 63 and a movable magnetic core 64, which is connected to the free end of the arm. One end of coil 63 is connected to battery 33, and the other end of the coil is connected to a movable switch arm 65, which may be a spring blade normally held away from the associated fixed contact 66. When the coil 36 is energized, as previously explained, the switch arm 65 is closed and the solenoid coil 63 is energized to rock the arm 59 and thereby close the valve 58, so that the fuel mixture is cut off from the engine and the car stops. When the circuit of coil 36 is opened, the solenoid coil 63 is deenergized and the tensioned spring 60 moves the valve 58 back to normal open position.

It may not be necessary in all cases to put on the brakes at the same time that the engine of a car is disabled upon entering the lighted danger zone on either side of the crossing. When the ignition is crippled or the fuel supply cut off, the engine automatically stops to function, although the car will continue to move ahead by virtue of its momentum. However, each compression stroke of the disabled engine acts like a brake and tends to retard the forward movement of the car. Of course, for a quick stopping of the car, especially if the latter has been going at a fast speed, it is necessary to apply the brakes simultaneously with the disabling of the engine. As I said before, I believe that it will be sufficient to use the flywheel of the engine as a brake by installing the brake-shoe 46 and the associated mechanism under the hood, so that it will not be necessary to touch the wheel brakes of the car. In any case, when the driver of a car entering the lighted danger zone finds that the engine suddenly stops functioning, he will naturally put on the brakes to stop the car quickly, because he will then know that there is danger ahead.

Figure 6:
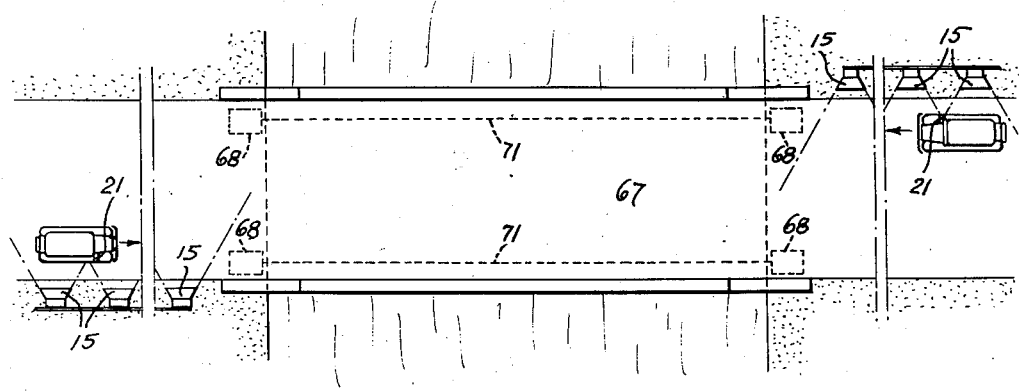
Fig. 6 is a plan of Fig. 5.
Figure 7:
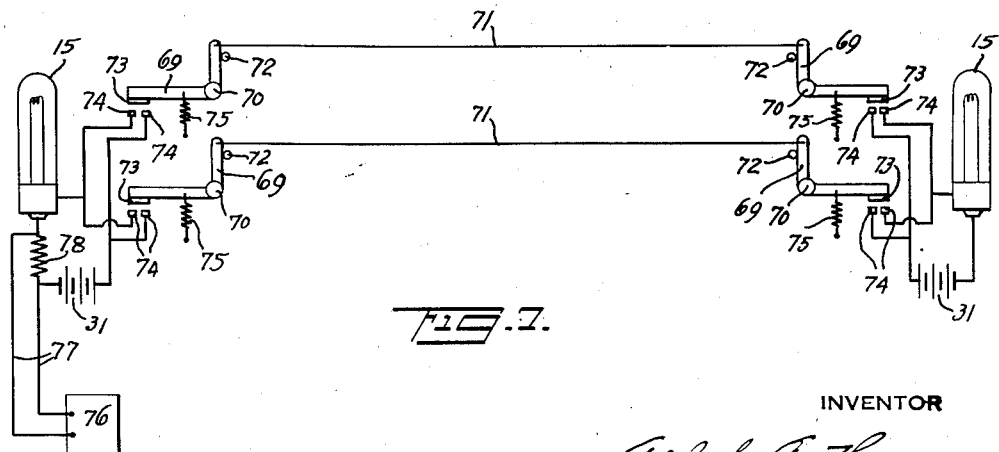
Fig. 7 shows the circuit connections controlled by the bridge in Figs. 5 and 6.

My automatic safety system is also adapted to eliminate motor accidents at highway bridges. Referring to Figs. 5, 6 and 7, there is a bridge 67 on an automobile highway. At either end of the bridge is a box or closed chamber 68 in which a pivoted bellcrank 69 is mounted. I have shown two pairs of chambers or boxes 68 arranged at both sides of the bridge, although in actual practice it might be sufficient to have only one pair of chambers located centrally of the bridge. The bellcranks 69 are pivoted at 70, and each pair of bellcranks at opposite ends of the bridge is connected by a strong wire, chain or small cable 71, which is maintained in taut condition and holds the connected bellcranks against fixed stops 72. The tensioned members 71 are rustproof and run as close to the underside of the bridge as practical conditions permit. In Figs. 5 and 6 the position of wires 71 is indicated merely in a diagrammatic way. The taut wires 71 pass through small holes in the boxes or closed chambers 68, which are supposed to be buried under ground or set into the supporting masonry on each end of the bridge.

Each bellcrank 69 carries a contact piece 73 adapted to engage a pair of adjacent insulated contacts 74. The electric lamps 15 at each end of the bridge are connected to battery 31 through contacts 74. If more than one pair of contacts 74 is used, the pairs are connected in parallel, so that the closing of any pair will light all the lamps 15 on either side of the bridge. It will be understood that the arrangement of lamps 15 in Figs. 5 and 6 is the same as in Fig. 1, so that I need not repeat that part of the specification. The wires or cables 71 are so tensioned that the bellcranks 69 are held firmly against the fixed stops 72, whereby the connecting pieces 73 are out of engagement with contacts 74. The parts remain in this position as long as the bridge 67 is in safe condition, and the lamps 15 do not interfere with automobiles crossing the bridge. If, however, the bridge is demolished, as by a storm, flood, or otherwise, the sinking of any portion of the bridge will sever one or both wires 71 and at least one pair of levers 69 will be rocked to the circuit-closing position by contracting coil springs 75. When any pair of contacts 74 is thus closed, all the electric lamps 15 on both sides of the demolished bridge are lighted and create two danger zones in which all entering automobiles are automatically stopped, as previously explained in connection with Figs. 1—4.

Since the lamps 15 in Figs. 5, 6 and 7 stay lighted as long as the bridge 67 remains in demolished or impassable condition, an automobile stopped within the danger zone should be able to reverse its course and go back over the road to find a safe detour. The disabled power plant of a car stopped near the demolished bridge is easily restored to operative condition by closing the window 23 of cell box 21 until the car has backed out of the lighted zone. For example, one of the occupants of the car need only place his hand or hat over the front of the cell box to shut out the light from lamps 15 and deenergize the photo cell. It is probably advisable to operate a distant signal (such as a bell or lamp) when the bridge 67 is down or otherwise unsafe to cross. In Fig. 7 the rectangular outline 76 represents the electric signal or alarm device located in a place where it would be noticed, such as the nearest telegraph office where the operator could instantly notify the proper officials of the demolished condition of the bridge. The signal device 76 is connected by wires 77 in shunt to a resistance 78, which is in series with lamps 15. When any pair of contacts 74 is closed by the breaking of one or both wires 71, as above set forth, the alarm device 76 is actuated to indicate the unsafe condition of bridge 67. It will be understood that the alarm device 76 may be operatively connected in circuit in any other practical way when the bridge 67 is in uncrossable condition.

Many bridges that connect streets and other highways run across navigable rivers and must open to permit the passing of ships. Such bridges are either of the drawbridge type arranged to swing horizontally, or of the jack-knife type in which one or two sections of the bridge swing vertically. In Figs. 9, 10 and 11 I have illustrated a drawbridge for automatically lighting the lamps 15 on either side of the bridge when the draw is open or is in the act of opening. The draw 79 is supposed to swing about a center 80. A bellcrank 81, pivoted at 82 near one or both ends 83 of the bridge, carries a roller 84 at one end and at the other end a connecting piece 85. When the draw 79 is in normal closed position, the curved edge of the bridge engages the roller 84 and holds the bellcrank 81 in the position shown in Fig. 10. The controlling lamps 15 are connected in parallel in the circuit of battery 86, which is closed through a pair of switch contacts 87 adapted to be engaged by the connecting piece 85 of bellcrank 81.

As long as the draw 79 is closed, the bellcrank 81 is held in such position that the switch contacts 87 remain open. When the bridge is swung open, the roller 84 is disengaged by the edge of the moving bridge and a contracting coil spring 88 instantly rocks the lever clockwise, so that the connecting piece 85 closes the adjacent contacts 87. The electric lamps 15 at both ends of the open draw are lighted and automatically stop any automobile or other self-propelled vehicle that enters the illuminated danger zone, as previously described in connection with Figs. 1-4. When the draw 79 moves to closed position, the bellcrank 81 is rocked counterclockwise to open the switch contacts 87 and extinguish the lamps 15. The bellcrank 81 may also be operated by the jack-knife or bascule type of bridge. For example, in Figs. 10 and 11 we may suppose that the bridge section 79 swings up and down. As long as the bridge is down in normal position, the switch contacts 87 are open, but when the bridge rises the roller 84 is disengaged and the spring 88 rocks the bellcrank 81 to circuit-closing position.

If the bridges 67 and 79 are railroad bridges intended for the passage of trains and not automobiles, the automatic safety system above described may be used for stopping a train when the bridge is uncrossable, as when the bridge is destroyed or the draw is open. It is only necessary to equip a train with one or more photo cells 22 arranged to receive light waves from lamps 15 to turn off the steam and apply the brakes. An automatic train-stopping system is diagrammatically illustrated in Fig. 8 where the energizing of photo cell 22 by lamps 15 closes the circuit of battery 89 through a solenoid coil 90. A lever 91 fixed on a rotary shaft 92 is connected at one end to a magnetic core or plunger 93 associated with coil 90. A contracting coil spring 94 normally holds the lever 91 against a fixed stop 95. A steam-supply pipe 96 is controlled by a rotary valve 97 which has an arm 98 connected to or engaging the adjacent end of lever 91. If the two members 91 and 98 are not permanently connected but merely in contact with each other, the arm 98 is normally held in valve-closing position by a contracting coil spring 99. The shaft or rod 92 also carries an arm 100 arranged in contact with (or connected to) an arm 101 which operates a rotary valve 102 in an airbrake pipe 103. A contracting coil spring 104 normally holds the valve 102 in closed position.

As long as the photo cell 22 in Fig. 8 receives no light from the controlling lamps 15 (which means that the bridge ahead is in safe condition), the steam valve 97 is open and the air valve 102 is closed. In other words, the train is free to proceed on its journey. If, however, the bridge is uncrossable and the lamps 15 are lighted, the activation of photo cell 22 energizes the solenoid coil 90 which pulls down its magnetic plunger 93 and rocks the levers 91 and 100 counterclockwise (as viewed in Fig. 8). Consequently, the arm 98 is moved clockwise to close the steam valve 97 and the arm 100 is moved in the same direction to open the air valve 102. In other words, the energizing of coil 90, due to the unsafe condition of the bridge ahead, cuts off the steam from the locomotive cylinders and at the same time puts on the brakes, so that the train is quickly brought to a stop. The valves 97 and 102 may be operated manually by the engineer to restore the locomotive to operative condition, so he can run the train backward if necessary. The valve mechanism of Fig. 8 may also be applied to automobiles or other self-propelled vehicles in which the pipe 96 controls the fuel supply and the pipe 103 controls the operation of air brakes.

The switch-controlling bellcranks 69 and 81 may also be used to close the circuit of lamps 15 when any portion of a highway or roadbed is impassable for trains and other vehicles. For example, the wires 71 can be stretched along railroad tracks in such position that, when the tracks are out of normal safe position, the wires will break and cause the bellcranks 69 to close the circuit of lamps 15. In this way it is possible to guard railroad tracks where washouts and other dangerous conditions are liable to occur, so that trains will be automatically stopped when the roadbed has for some reason been demolished.

In the drawings I have shown the controlling lamps 15 arranged along the highway on either side of a grade crossing or bridge to throw a flood of light transversely across the highway. Any other practical arrangement of lamps 15 may be used and my invention is not intended to be limited in this respect. For example, the lamps 15 can be mounted on tall posts and arranged crosswise of the highway to throw the light in the direction of the approaching vehicles. In that case the photo cell boxes 21 would be mounted in position to receive the light rays from lamps 15. One advantage of mounting the box 21 near the hood of the car is the short wiring necessary to connect the cell 22 with the electric mechanism in the car.

In the broader aspect of my invention, the elements 15 may send out other kinds of vibration than light waves when the highway becomes impassable, and the elements 22 may be of such a nature as to be energized by the vibrations coming from elements 15. Thus, the elements 15 might be telephone transmitters adapted to generate sound waves of predetermined frequency and strength, and the elements 22 would then be telephone receivers tuned to be actuated by those particular sound waves for operating the mechanism that stops the automobile or train when it enters the danger zone.

Although I have shown and described certain specific constructions, my invention is not limited to any details set forth. The basic idea of my invention may be embodied in other forms without departing from the scope of the appended claims.

I claim as my invention:

1. A trackless vehicle operated by an internal combustion engine and provided with photo-electric means for stopping its engine when said means is optically energized, the engine being automatically restored to operative condition by the de-energizing of said means.

2. A trackless vehicle operated by an internal combustion engine and provided with photoelectric means for cutting off the fuel supply from the engine when said means is optically energized, said fuel supply being automatically restored when said means is de-energized.

3. A trackless vehicle driven by an internal combustion engine and having a photo-electric cell arranged to be activated by a source of light on a highway, means for automatically stopping the engine of said automobile when the cell is activated, and means for automatically restoring the engine to operative condition when the cell becomes inactive.

4. A trackless vehicle operated by an internal combustion engine and having a photo-electric cell arranged to be activated by a source of light on a highway, and means for automatically disabling the ignition system of said automobile when the cell is activated.

5. In an automatic safety system for self-propelled vehicles, means for automatically stopping a vehicle when it approaches a bridge which is unpassable, said means including a photo-electric device controlled by the condition of said bridge.

6. In an automatic safety system for trackless vehicles like automobiles propelled by internal combustion engines and travelling over the roadbed of highways, the combination of means located above the highway and independent of the roadbed for projecting wave energy over the highway into the path of an approaching automobile when the highway at a certain point ahead is impassable or can not be traversed by the car in safety, and means on the vehicle adapted to be controlled by the projected wave energy for stopping the vehicle.

7. In an automatic safety system for trackless vehicles propelled by internal combustion engines and travelling on highways, the improvement which consists in automatically stopping a car by optically disabling its power plant when the car approaches a railroad track on which a train is crossing or approaching within a specified distance.

8. An automobile provided with brake means normally inoperative, and optically controlled means for automatically disabling the power system of the car and rendering said brake means operative when the automobile approaches a railroad crossing on which a train is within a certain distance from the highway where the car is travelling.

9. In an automatic safety system for self-propelled trackless vehicles like automobiles travelling over the roadbed of highways, means for automatically disabling the power plant of an automobile when the latter approaches a dangerous condition on the highway, said means including a source of wave energy on the highway and a device on the car adapted to be operatively influenced by said wave energy, which is of predetermined frequency, and means for supporting said source of energy at a distance from the roadbed and independently thereof.

10. In an automatic safety system for self-propelled trackless vehicles like automobiles travelling on highways, means for automatically disabling the power system of an automobile when the latter approaches a dangerous condition on the highway, and means controlled by the condition of the highway for automatically restoring said power system to operative condition when said dangerous condition on the highway ceases.

11. In an automatic safety system for automobiles travelling on highways, means for automatically disabling the power plant of an automobile when the latter approaches a railroad crossing on which a train is passing or is about to pass, said means including a source of light of a certain color controlled by the train and a photo-electric cell on the car adapted to respond only to said colored light.

12. In an automatic safety system for self-propelled vehicles, an electric lamp located at one or each end of a bridge, a switch adapted to remain open as long as the bridge is in normal safe condition, means whereby said switch is closed to light said lamp when the bridge is not in safe condition, and mechanism operated by the lighted lamp for stopping a self-propelled vehicle when it approaches the unsafe bridge.

13. In an automatic safety system for automobiles travelling on highways, means for automatically producing a field of light waves of predetermined frequency on a highway whenever a dangerous traffic condition ahead exists, an automobile having a photo-electric cell which is operatively responsive only to light waves of said frequency, said cell being arranged in the path of said light waves when the car enters that part of the highway, and means controlled by the activated cell to disable the power plant of the car.

14. In an automatic safety system for self-propelled vehicles approaching bridges on highways comprising a source of light arranged at one or both ends of a bridge, said source of light being inoperative as long as the bridge is in normal safe condition, means for automatically causing said source of light to throw light rays across the highway when the bridge becomes impassable, in combination with a self-propelled vehicle having a photo-electric cell arranged to be activated by said light rays, and means controlled by the activated cell for automatically stopping the vehicle.

15. An automatic safety system for automobiles at railroad crossings comprising a source of light arranged on a highway on one or both sides of a railroad crossing, said source of light being normally inoperative, means whereby the presence of a train within a certain distance from the highway automatically renders said source of light operative to throw light rays across the highway, in combination with an automobile having a photoelectric device arranged to be activated by said light rays, and means controlled by the activated device for automatically stopping the car.

16. An automatic safety system for automobiles at railroad crossings comprising a series of electric lamps arranged along a highway on one or both sides of a railroad crossing, the circuit of said lamps being normally open, means whereby the presence of a train within a certain distance from the highway automatically closes the lamp circuit, so that the lamps throw a flood of light across the highway, in combination with an automobile carrying a photo-electric cell arranged to be activated by the light of said lamps, and means for automatically disabling the engine of the car when the cell is activated, whereby the car can not proceed toward the crossing as long as a train is within a prescribed distance of the highway.

17. An automatic safety system for automobiles at railroad crossings comprising a source of light arranged on a highway on one or both sides of a railroad crossing, said source of light being normally inoperative, means whereby the presence of a train within a certain distance from the highway automatically renders said source of light operative to throw light rays across the highway, in combination with an automobile having a photo-electric device arranged to be activated by said light rays, and means for causing said device when activated to disable the ignition system of the car and thereby bring the latter to a stop, the ignition system being automatically restored to operative condition when said source of light becomes inoperative.

18. An automatic safety system for automobiles at railroad crossings comprising a series of electric lamps arranged along a highway on one or both sides of a railroad crossing, the circuit of said lamps being normally open, an insulated track section extending across the highway for a certain distance, means for automatically closing the lamp circuit when a train is on said insulated section, so that a flood of light is thrown across the highway, in combination with an automobile carrying a photo-electric cell arranged to be activated by the light of said lamps, and means for automatically causing the activated cell to disable the power plant of the car, so that the latter can not proceed toward the crossing as long as a train is on said insulated section.

19. A trackless vehicle propelled by an internal combustion engine and provided with photo-electric means for affecting the operation of the engine, in combination with a source of light arranged above a highway on which the vehicle is travelling, and means controlled by a train crossing said highway for energizing said source of light which controls said photo-electric means.

20. In an automatic safety system for self-propelled vehicles travelling on highways which include a bridge, mechanism for automatically stopping an approaching vehicle when the bridge is unpassable, said mechanism including photo-electric means carried by the vehicle.

21. In an automatic safety system for self-propelled vehicles travelling on highways which include a bridge, an electric device automatically energized to produce wave energy when the bridge is demolished, and means controlled by said wave energy for automatically stopping a vehicle when it approaches the demolished bridge.

22. In an automatic safety system for self-propelled vehicles travelling on highways which include a bridge, an electric lamp automatically lighted when the bridge is demolished, and photo-electric means controlled by said lamp for automatically stopping a vehicle before it reaches the demolished bridge.

23. In an automatic safety system for highways including a bridge, a flexible member adapted to be broken when the bridge is demolished, an electric lamp automatically lighted by the breaking of said member, and means controlled by said lamp for automatically stopping a vehicle when it approaches the demolished bridge.

24. In an automatic safety system for trains, normally inoperative means automatically rendered operative when a section of track is demolished, in combination with a train having mechanism controlled by said operative means to stop the train before it reaches the demolished track, said mechanism including a photo-electric device controlled by said means.

25. In an automatic safety system for self-propelled vehicles approaching bridges on highways, the combination of a source of light arranged at one or both ends of a bridge, said source of light being inoperative as long as the bridge is in normal safe condition, and means for automatically causing said source of light to throw light rays across the highway when the bridge becomes impassable.

26. In an automatic safety system for self-propelled trackless vehicles travelling on a highway which passes over a railroad track, mechanism for automatically stopping a vehicle approaching the track when a train is crossing or is about to cross, said mechanism including photo-electric means carried by the vehicle.

27. In an automatic safety system for automobiles travelling over the road bed of highways, electric apparatus free from operative devices embedded in the road bed for automatically disabling the power system of an automobile when the latter approaches a railroad crossing on which a train is passing or is about to pass, said power system being automatically restored to operative condition when the train has passed a predetermined distance beyond the highway, said apparatus being operative regardless of the position of an approaching automobile on the highway.

28. In an automatic safety system for self-propelled vehicles travelling on highways which include a bridge, the combination of a source of light arranged on the highway at one or both ends of the bridge, said source of light being normally inoperative, means for automatically energizing said source of light when the bridge is uncrossable, photo-electric means carried by a vehicle approaching the bridge and adapted to be activated by the light from said source, and means for automatically stopping the vehicle when said photo-electric means is activated.

ADOLPH A. THOMAS.